United States Patent [19]
Ballast et al.

[11] Patent Number: 5,810,606
[45] Date of Patent: Sep. 22, 1998

[54] ARTICULATING CONNECTOR TRANSMISSION SYSTEM FOR SIGNAL DATA AND POWER

[75] Inventors: Ronald L. Ballast, Novi; John A. DeFranco, Farmington Hills, both of Mich.; Lawrence T. Rupert, Carthage, Ill.

[73] Assignee: Methode Electronics, Inc., Chicago, Ill.

[21] Appl. No.: 900,962

[22] Filed: Aug. 12, 1997

Related U.S. Application Data

[63] Continuation of Ser. No. 482,824, Jun. 7, 1995, abandoned.

[51] Int. Cl.⁶ ........................................... H01R 3/00
[52] U.S. Cl. ................................. 439/15; 385/26
[58] Field of Search ................... 439/15, 21, 22, 439/27, 488, 489; 385/26; 455/41, 90

[56] References Cited

U.S. PATENT DOCUMENTS

| | | | |
|---|---|---|---|
| 3,517,108 | 6/1970 | McCarthy | 439/21 |
| 4,138,177 | 2/1979 | van Valer | 439/21 |
| 4,854,662 | 8/1989 | Estes et al. | 385/26 |
| 4,953,932 | 9/1990 | Minich | 385/26 |
| 4,973,123 | 11/1990 | Lutzeler | 439/164 |
| 5,061,195 | 10/1991 | Bolen | 439/164 |
| 5,171,157 | 12/1992 | Bolen | 439/164 |
| 5,429,508 | 7/1995 | Brevick | 439/15 |
| 5,429,517 | 7/1995 | Bolen | 439/164 |
| 5,431,440 | 7/1995 | Spies et al. | 280/735 |
| 5,436,988 | 7/1995 | Narendran | 385/26 |

OTHER PUBLICATIONS

Connector Specifier, Multiplexing Reduces Required Wiring, May 1995.

*Primary Examiner*—Gary F. Paumen
*Assistant Examiner*—T. C. Patel
*Attorney, Agent, or Firm*—David L. Newman; Jefrey H. Canfield

[57] ABSTRACT

An articulating connector assembly having a housing, a hub being carried in rotatable relation to the housing; and means for signal coupling between the housing and the hub. The signal coupling can consist of means such as optical coupling, inductive coupling, radio frequency coupling, capacitive coupling, and pressure wave coupling. In addition, the articulating connector assembly can further include power coupling which can be accomplished by siding contacts, inductively coupled coils, capacitively coupled electrodes, or optical transmitters and receivers on the hub and the housing. Furthermore, a method of efficiently transmitting and receiving signals between the housing and hub is provided. The method consists of (1) obtaining an input signal, by a signal driver, to produce a driven signal output; (2) coupling the driven signal output to produce a coupled signal; and (3) receiving the coupled signal, by a receiver, to produce an output signal. In addition, the method can further include decoding and encoding, respectively, of the output and input signals.

16 Claims, 16 Drawing Sheets

ARTICULATING CONNECTOR TRANSMISSION SYSTEM FOR SIGNAL DATA AND POWER

This is a continuation of application Ser. No. 08/482,824, filed Jun. 7, 1995 abandoned.

BACKGROUND OF THE INVENTION

The present invention relates to an articulating connector transmission system for signal, data, and power which provides signal coupling for data transfer between a stationary housing and a rotatable hub, and in particular to efficient data transfer and signal coupling which allows for the unlimited rotation of the hub with respect to the housing.

Rotary signal transducers, or clocksprings, are typically used in applications such as connecting automotive steering wheel mounted electronic circuits, including switches, lights, and an airbag squib, to other sensing and control electronic circuits mounted in various other locations of the automobile.

For example, U.S. Pat. No. 5,061,195 (1991), issued to Bolen, discloses a type of transducer, described as a clockspring, which provides a direct electrical connection between relatively movable members in the steering apparatus of an automobile. In this type of clockspring construction, a ribbon cable is used to provide the electrical connection between the relatively movable members. The ribbon cable is constructed of conductive material which is sandwiched between two layers of mylar. The cable is loosely accommodated in a coiled state within the clockspring's housing. In addition, one end of the cable is attached to the clockspring's stationary housing and the other end of the cable is attached to the clockspring's rotatable hub.

In operation, the ribbon cable will either wrap or unwrap around the hub when the hub is rotated. However, in order to prevent the cable from being damaged during rotation of the hub, no substantial tensile force can be applied to the ribbon cable while it is wrapping or unwrapping. Thus, the length of the cable determines how many times the hub can be rotated. If the hub is rotated too far in one direction, then an overwound condition is said to occur which results in a significant amount of damaging tensile force being applied to the cable.

In order to prevent excess tensile force from being applied to the cable, it is necessary for the hub to be centered when it is mounted on the steering apparatus. Centering of the hub allows for the same extent of clockwise and counterclockwise rotation of the hub before the ribbon cable becomes overwound.

If the hub is not in the centered position when the clockspring is mounted on the steering apparatus, then the cable will be damaged when it is completely wrapped and/or unwrapped around the hub while the steering apparatus is continued to be forced to turn.

To ensure that the clockspring is centered when it is mounted on the steering apparatus, external locking mechanisms are sometimes used such as those described in U.S. Ser. No. 08/285,021. These locks allow only limited rotational travel of the hub prior to the clockspring's installation. The external lock is disengaged by removing it from the clockspring and discarding it.

Likewise, internal locking mechanisms are also sometimes used in order to prevent rotation of the hub such as U.S. Pat. No. 5,171,157 (1992), issued to Bolen. An internal lock limits the travel of the hub whenever the clockspring is not mounted to the steering apparatus. The internal lock is usually disengaged by a pin or other unlocking system which is provided by the steering apparatus. The clockspring's lock will reengage whenever the clockspring is removed from the steering apparatus.

However, if the clockspring is removed from the steering apparatus and then subsequently reinstalled, both the external lock and the internal lock will fail to ensure and/or indicate when the transducer's hub is properly centered.

Many devices have been proposed which provide a way of indicating if the clockspring's hub is centered. However, these devices cause an increase in the diametrical size of the transducer and/or require the use of gears or other mechanisms which have a very limited useful life due to their constant rotating or relative motion whenever the hub rotates.

In addition to the centering problems posed by the prior art clocksprings, the ribbon cable used in the clockspring produces unwanted noise due to vibration, impact, and its sliding during winding and unwinding.

Also the small cross sectional area and long length of the conductors within the multi-conductor ribbon cable pose significant limitations on electrical current flow due to voltage drop and self heating.

Additionally, sliding contacts are known in the field of rotary signal transducers, but are electrical noisy and are not sufficiently reliable for data communication transfer without error checking techniques which slow down data transfer.

Therefore, a device is proposed which provides signal coupling between the rotating hub and stationary housing of an articulating connector transmission assembly. This device thereby eliminates the need to center the hub and housing members and also removes unwanted audible noise associated with the conductive tape in a clockspring.

In view of the above, it is an object of the present invention to provide a hub and a housing which does not require centering.

A further object of the invention to eliminated the possibility of an overwound condition.

Still further, another object of the present invention is to provide an efficient data transfer method between the hub and the housing of an articulating connector transmission assembly.

Another object of the present invention is to provide an efficient signal, data, and power transfer method between the hub and the housing of an articulating connector transmission assembly, which with accompanying energy storage and suitable electronic circuitry, comprise a system for implementing a variety of reliable input and output functions on the hub member without the disadvantages of clocksprings or conventional rotary connectors.

Furthermore, other objects, features, and advantages of the present invention will be apparent from the following detailed description taken in connection with the accompanying drawings.

SUMMARY OF THE INVENTION

The present invention provides efficient signal, data and power transmission while allowing unlimited rotation of an articulating connector transmission hub with respect to a stationary housing. To this end, in one form of the invention, an articulating connector transmission assembly is provided which has a housing, a hub being carried in rotatable relation to the housing, and means for signal coupling between the housing and the hub. The signal coupling can consist of means such as optical coupling, inductive coupling, radio frequency coupling, pressure wave or vibration coupling, capacitive coupling, and multiple redundant moving contacts. In addition, the articulating connector transmission assembly can further include power transfer between the housing and hub, which can be accomplished by moving contacts, inductively coupled coils, or optical transmission and photovoltaics, or capacitively coupled electrodes.

Furthermore, a method of efficiently transmitting signals between the housing and the hub is provided. One method consists of (1) obtaining an input signal, by a signal driver, to produce a driven signal output of some physical property such as light, electromagnetic radiation, magnetic field, electric field, pressure waves, etc.; (3) receiving the driven signal output, by a receiver, to produce an output signal. In addition, the method can further include decoding and encoding, respectively, of the output and input signals.

Various means for practicing the invention and other advantages and novel features thereof will be apparent from the following detailed description of several illustrative preferred embodiments of the invention.

BRIEF DESCRIPTION OF THE DRAWINGS

There are shown in the drawings several presently preferred embodiments of the present invention, wherein like numerals in the various figures pertain to like elements, and wherein.

DETAILED DESCRIPTION OF THE PRESENTLY PREFERRED EMBODIMENTS

Figure 1:
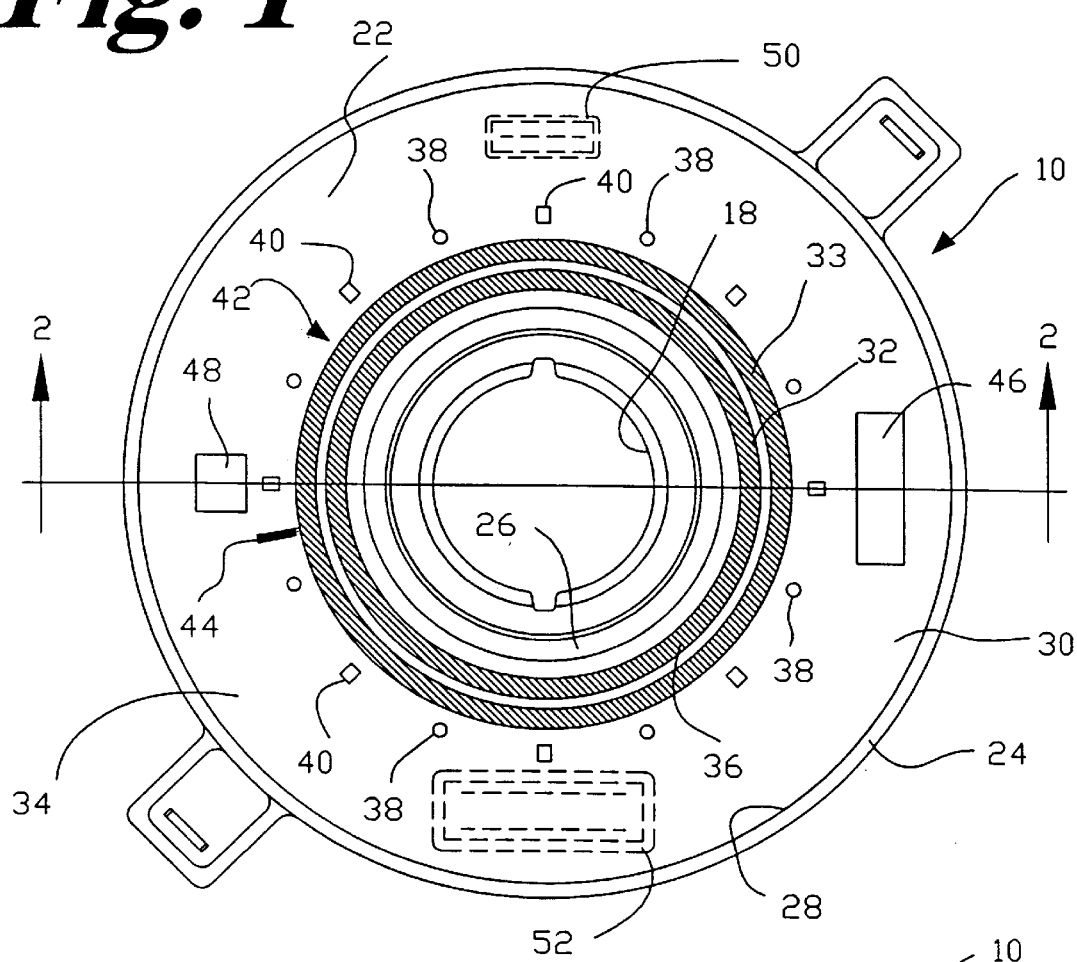
FIG. 1 is a plan view of an articulating connector housing assembly employing coupling in accordance with the present invention.
Figure 2:
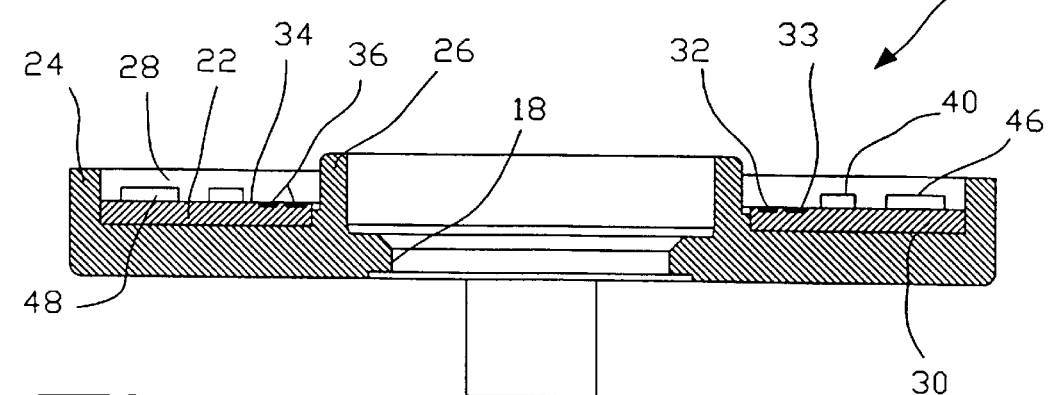
FIG. 2 is a cross-sectional side view of the articulating connector housing assembly depicted in FIG. 1, taken along line 2—2.
Figure 3:
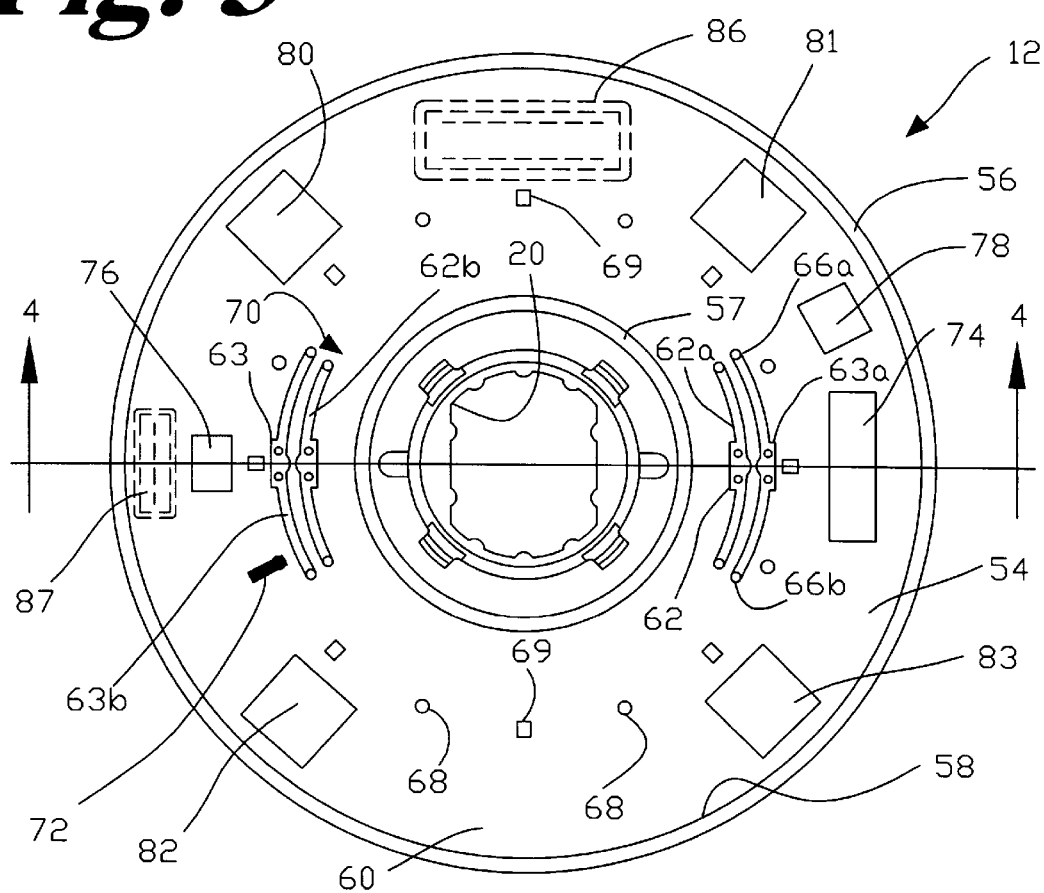
FIG. 3 is a plan view of an articulating connector hub assembly employing coupling in accordance with the present invention.
Figure 4:
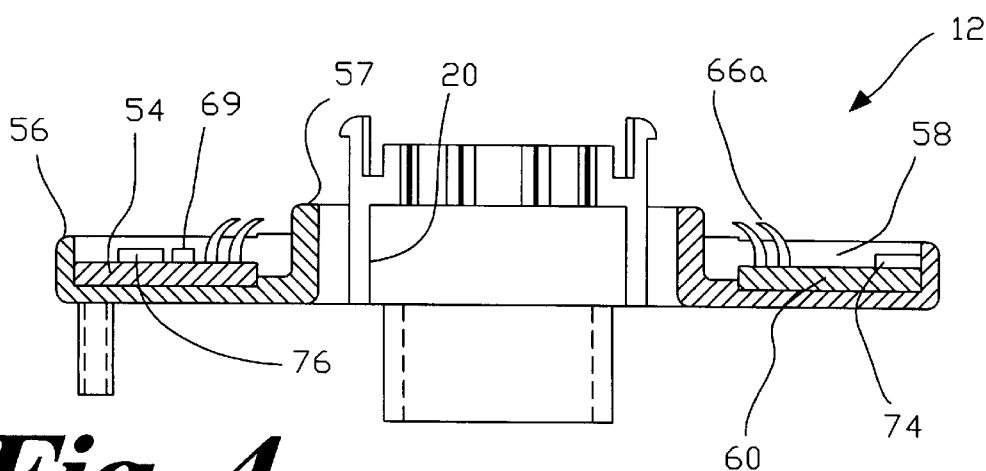
FIG. 4 is a cross-sectional side view of the hub assembly depicted in FIG. 3, taken along line 4—4.
Figure 5:
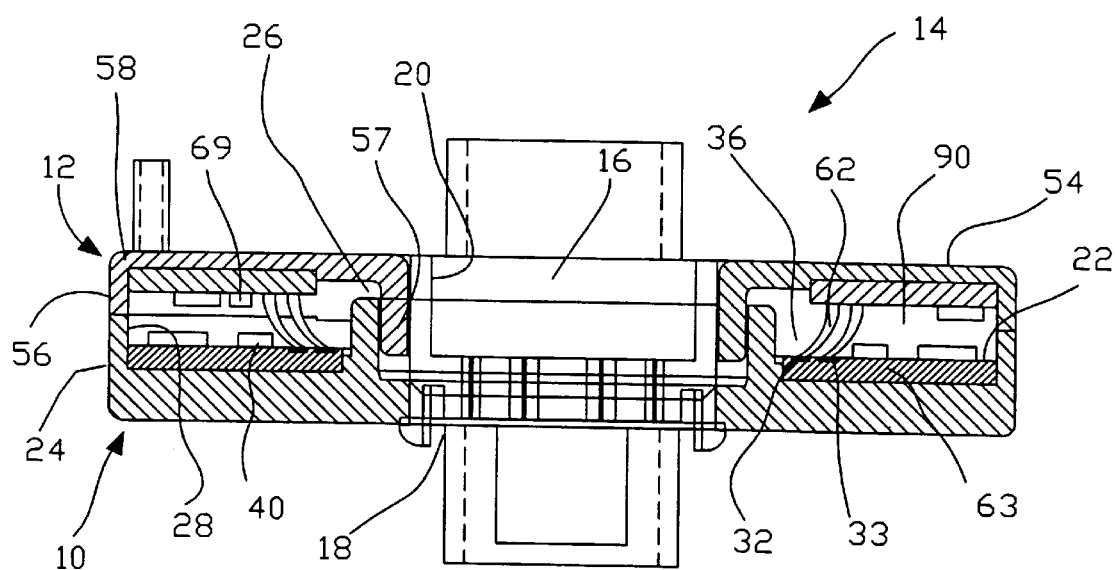
FIG. 5 is a cross-sectional side view of an articulating connector assembly with the housing of FIG. 2 rotatably attached to the hub of FIG. 4.

Referring to the drawings, and particularly to FIGS. 1–4, a plan view and a cross-sectional side view is provided for both an articulating connector housing assembly 10 and a hub assembly 12. Correspondingly, as shown in FIG. 5, the hub 12 of FIG. 3 and 4 is rotatably mounted to the housing 10 of FIG. 1 and 2 in order to form an articulating connector assembly 14 in accordance with the present invention. Rotational mounting of the hub 12 to the housing 10 can be completed in any conventional manner such as that depicted by U.S. Pat. No. 5,061,195 (1991), issued to Bolen, which is incorporated herein by reference. In a preferred embodiment the hub 12 may rotate with a steering wheel and the housing remains stationary with a steering column. Extending through the articulating connector assembly 14 is a center aperture 16 which consists of a first aperture 18 which extends through the housing 10 and a second aperture 20 which extends through the hub 12.

As shown in FIGS. 1 and 2, the articulating connector housing 10 is generally circular in shape with the first aperture 18 being located at its center. Extending around the top 22 of the articulating connector housing 10 is an outer wall 24 and an inner wall 26. The outer wall 24 extends around the outer circumference of the articulating connector housing 10 and the inner wall 26 extends around and adjacent to the housing's first aperture 18. Together the inner wall 26 and outer wall 24 form a radial depression 28 along the top 22 of the housing 10.

Mounted to the housing 10 within the radial depression 28 is a circuit board 30. The circuit board 30 is shaped like a large flat washer so that it fits within the housing's radial depression 28. Mounted partially within the circuit board 30 are two circular tracks 32,33 which have different circumferences and are made of a conductive material such as copper or a copper alloy. Each track 32,33 forms a continuous circle around the housing's first aperture 18 with track 32 being closest to the aperture and surrounded by track 33. Furthermore, each track 32,33 is flush with the top surface 34 of the circuit board 30 in order to provide an exposed surface 36.

Also mounted to the circuit board 30 are a plurality of optical transmitters 38 and optical receivers 40 which are uniformly spaced apart from each other. The optical transmitters 38 can consist of various types of emitting devices such as GaAlAs Infrared Emitting Diodes. Likewise the optical receivers 40 can consist of various types of detecting devices such as NPN silicon phototransistors or PN photodiodes. It should be noted that the number of optical transmitters 38 are equal to the number of optical receivers 40.

Together, the transmitters 38 and receivers 40 extend around the conductive track to define a circular coupling ring 42 with each transmitter being surrounded by two receivers. Also positioned within the coupling ring 42 is an optical wiper 44 for cleaning the hub's optical transmitters and receivers which will be described later herein.

Various electrical components 46,48 are also mounted to the housing's circuit board 30. The electrical components 46,48 perform operations for receiving and transmitting signals to the hub assembly 12 such as, for example, optical driving, optical receiving, and multiplexing as described later herein. Furthermore, the electrical components 46,48 receive and transmit signals via two connectors 50,52 which extend from the housing 10.

Moving to FIGS. 3 and 4, the articulating connector hub 12 is generally circular in shape, like the housing assembly 10, with the second aperture 20 being located at the hub's center. Extending around the top 54 of the hub 12 is an outer wall 56 and an inner wall 57. The outer wall 56 extends around and adjacent to the outer circumference of the hub 12 and the inner wall 57 extends around the hub's aperture 20. Together the inner wall 57 and outer wall 56 form a radial depression 58 within the hub 12. Mounted to the hub 12 within the radial depression 58 is a circuit board 60. Correspondingly, the circuit board 60 is shaped like a large washer so that it fits within the hub's radial depression 58.

Two sets of brushes 62,63 are made of conductive material. For example, copper or copper alloy and liquid metal wetted contacts of mercury or other amalgams may be used. Alternatively beryllium copper contacts may be used or other configurations such as roller spring contacts may be mounted to the hub circuit board 60. Each set of brushes 62,63 forms part of a semicircle which brackets the hub's aperture 20 and has a curvature which is generally equal to that of the tracks 32,33 on the housing. Brushes 62a and 62b are located closest to the aperture 20 and are surrounded by brushes 63a and 63b. Furthermore, the center of each brush 62,63 is attached to the circuit board 60 by rivets with the two distal ends 66a,66b of each brush being angled away from the circuit board.

A plurality of optical transmitters 68 and optical receivers 69 are also mounted to the circuit board 60 and are uniformly spaced apart from each other. It is preferred that the transmitters 68 and receivers 69 consist of the same types of devices as those used in the housing assembly 10. However, it should be noted that one less or one more optical transmitter 68 and receiver 69 are used on the hub 12 than the quantity of transmitters and receivers used on the housing assembly 10 to provide even distribution of radiant energy, as discussed below.

Together, the hub's transmitters 68 and receivers 69 extend around the brushes 62,63 to define a circular coupling ring 70 having a circumference which is generally equal to that of the housing's coupling ring 42 with each transmitter 68 being surrounded by two receivers 69. Also positioned within the hub's coupling ring 70 is an optics wiper 72 for cleaning the housing's optical transmitters and receivers.

The hub's circuit board 60 also has various electrical components 74–83 mounted thereon. The electrical components 74–83 perform operations for receiving and transmitting signals to and from the housing assembly 10, along with power conditioning, which will be explained later herein. The electrical components also receive and transmit signals via two connectors 86,87 which extend from the hub 12.

Moving to FIG. 5, the hub 12 is shown rotatably mounted to the housing 10 so that the top 54 of the hub faces directly towards the top 22 of the housing. Correspondingly, the hub's outer wall 56 aligns with the housing's outer wall 24 and the housing's inner wall 26 is adjacent, but just inside, the hub's inner wall 57. The bearing surface between the outer walls 24, 56 are oriented to reduce noise by including a lubricant therebetween or providing an air gap. The radial space 90 formed by the hub's radial depression 58 and the housing's radial depression 28 provides adequate margin for the hub 12 to freely rotate relative to the housing 10.

In order to provide a means of power and ground transfer from the housing 10 to the hub 12, the brushes 62 and 63 are positioned so that they will remain in constant sliding contact with the housing's conductive tracks 32 and 33, respectively, as the hub is rotated. The constant electrical contact is maintained due to the resiliency of the brushes 62 and 63 which will cause their distal ends 36 to be pushed against the exposed surfaces of the conductive tracks 32 and 33, respectively, and due to the curvature of the brushes being equal to that of the conductive tracks.

Means of signal coupling, where the signal comprises data, from the hub 12 to the housing 10 is accomplished by the coupling rings 42 and 70. The signal coupling is provided by the hub's coupling ring 70, which consists of transmitters 68 and receivers 69, being positioned directly over the housing's coupling ring 42 which consists of transmitters 38 and receivers 40 on the housing 10.

When the hub 12 is rotated relative to the housing 10, there will be periods where one hub transmitter 69 or receiver 68 will be positioned directly over one housing receiver 40 or transmitter 38. However, as stated previously, there is one less or more transmitter 69 and receiver 68 on the hub 12 than on the housing 10. Thus, the amount of radiant energy which is received by both the housing 10 and hub 12 will be relatively evenly distributed, transmitted, and received due to the difference in spacing between the transmitters 38 and receivers 40 on the housing verses the transmitters 68 and receivers 69 on the hub 12.

During signal coupling between the hub 12 and the housing 10, different types of data transmission protocols can be implemented. For example, one channel of bidirectional simplex data transmission from the housing 10 to the hub 12 can be accomplished by the transmitters 68 on the hub 12 being commanded off while the receivers 69 on the hub are used to receive those light pluses generated by the transmitters 38 on the housing 10. Likewise, either after or before data is sent to the hub 12, the transmitters 68 on the hub will be commanded off while the receivers 40 on the housing 10 are used to receive those light pulses from the transmitters 38 on the housing.

More than one channel of data transmission (e.g., full duplex) between the housing 10 and the hub 12 can also be achieved by utilizing transmitters and receivers which produce and respond to only a specific wavelength. For example, two channels of data transmission can be employed by equipping the hub 12 and the housing 10 with two sets of transmitters and receivers which produce and respond to different wavelengths. Therefore, one data transmission channel will consist of those receivers and transmitters which operate at one wavelength while the second data transmission channel will consist of those receivers and transmitters which operate at the second (i.e., different) wavelength.

Simultaneous bi-directional data transmission between the housing 10 and the hub 12 can also be accomplished by again utilizing transmitters and receivers which produce and respond to a specific wavelength. For example, simultaneous bi-directional data transmission can be accomplished by equipping the hub 12 and the housing 10 with transmitters and receivers, respectively, which produce and respond to one specific wavelength and, correspondingly, outfitting the housing and the hub with transmitters and receivers, respectively, which operate at a second (i.e., different) wavelength. Therefore, simultaneous bidirectional data transmission is provided since one group of hub receivers and housing transmitters will operate at one wavelength while, at the same time, another group of housing receivers and hub transmitters will be operating at a second wavelength.

Referring to FIGS. 6–10, another embodiment of an articulating connector employing transmission in accordance with the present invention is provided. The numbering of the elements within FIGS. 6–10 correspond with those like elements in FIGS. 1–5. For example, the hub in FIGS. 1–5 is labeled "10" and the hub in FIGS. 6–10 is labeled "110".

Figure 6:
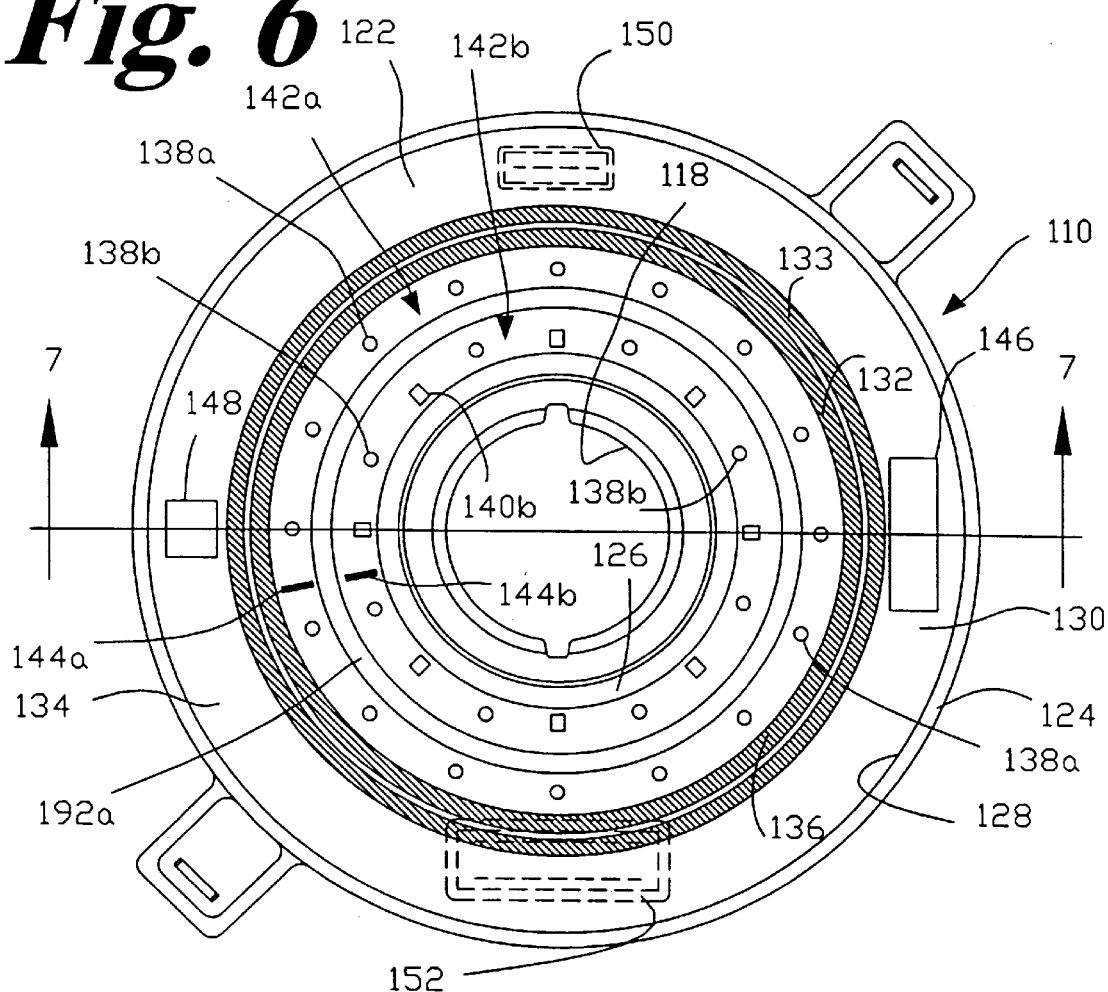
FIG. 6 is a plan view of another embodiment of an articulating connector housing assembly employing coupling in accordance with the present invention.
Figure 7:
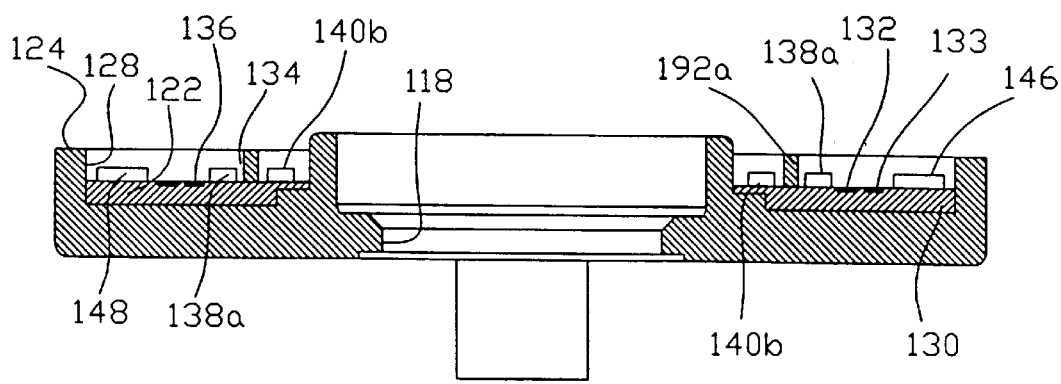
FIG. 7 is a cross-sectional side view of the articulating connector housing assembly depicted in FIG. 6, taken along line 7—7.

The primary difference between the embodiment depicted in FIGS. 6–10 from the embodiment in FIGS. 1–5 is that the articulating connector in FIGS. 6–10 has two signal coupling means instead of just one. In FIGS. 6 and 7 a plurality of optical transmitters 138b and receivers 140b are uniformly spaced apart from each other on the housing 110 to define a first circular configuration 142b. In addition, the number of transmitters 138b is equal to the number of receivers 140b with each transmitter being surrounded by two receivers.

A second circular coupling ring 142a is defined by uniformly spaced apart optical transmitters 138a located on the housing 110. The second coupling ring 142b is positioned between the housing's aperture 118 and the housing's outer coupling ring 142a. Furthermore, an intermediate circumferential wall 192a which is integral to the housing 110 is used to separate the inner coupling ring 142b from the outer coupling ring 142a.

In order to enhance the transmission and reception of the radiant energy between the housing and the hub, the circumference of both rings 142a and 142b, along with the wall 192a, may be coated with a reflective material such as, for example, a metalized plastic or an optically white paint.

Figure 8:
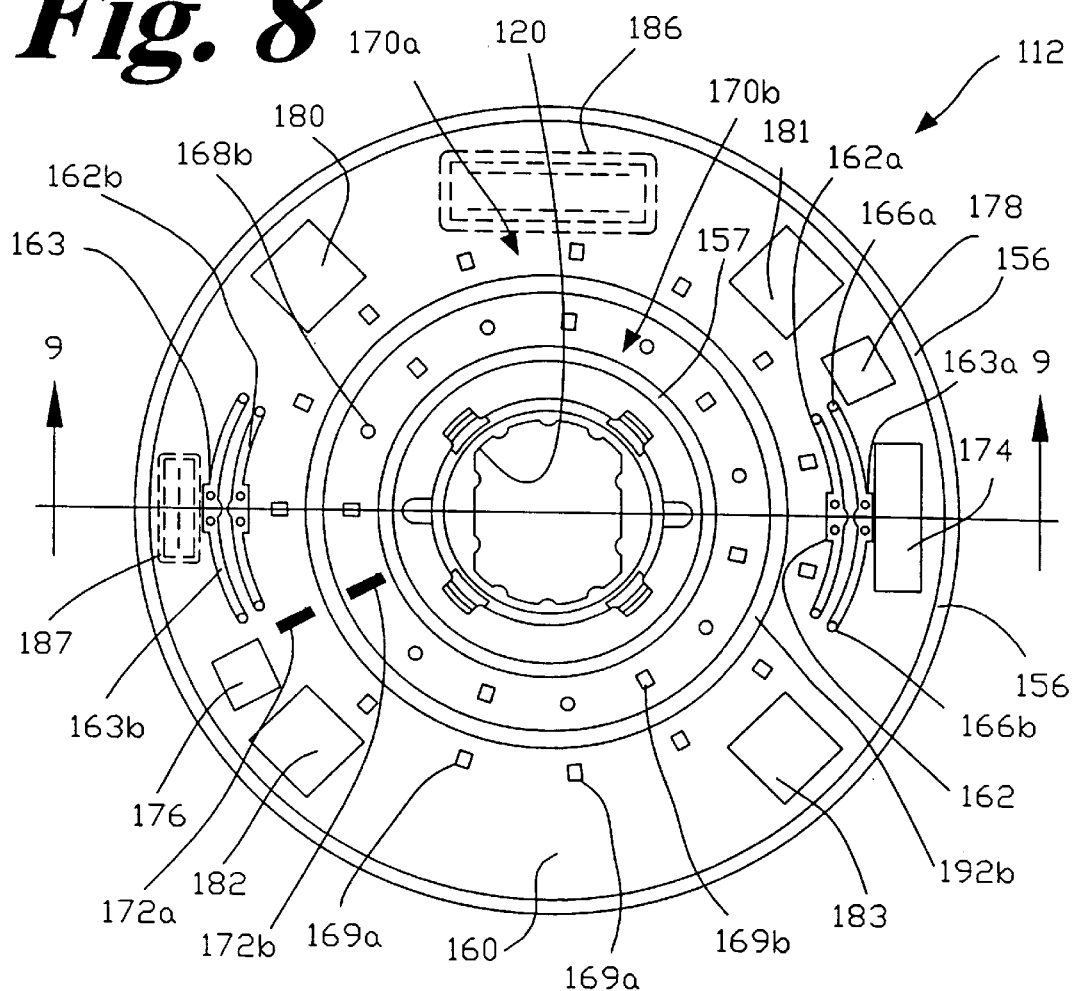
FIG. 8 is a plan view of another embodiment of an articulating connector hub assembly employing coupling in accordance with the present invention.
Figure 9:
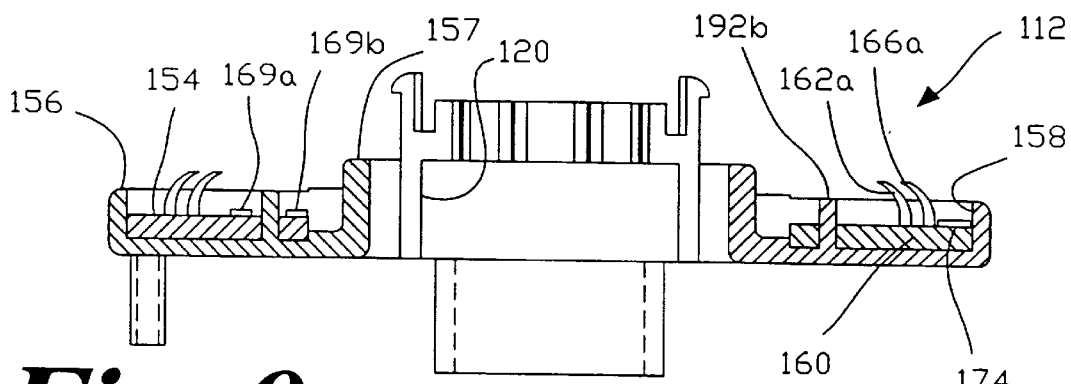
FIG. 9 is a cross-sectional side view of the articulating connector hub assembly depicted in FIG. 8, taken along line 9—9.

Correspondingly, referring to FIGS. 8 and 9, a plurality of optical transmitters 168b and receivers 169b are uniformly spaced apart from each other on the hub 112 to define a first coupling ring 170b. Likewise, a second coupling ring 170a is defined by uniformly spaced apart optical receivers 169a located on the hub 112. It is preferred that the transmitters 168 and receivers 169 which are mounted on the hub 112 consist of the same types of devices as those used in the housing 110. However, it should be noted that both the number of transmitters 168 and receivers 169 used to form the hub's coupling rings 170a and 170b contain one less or one more transmitter and receiver than those used in the housing's coupling rings 142a and 142b.

Figure 10:
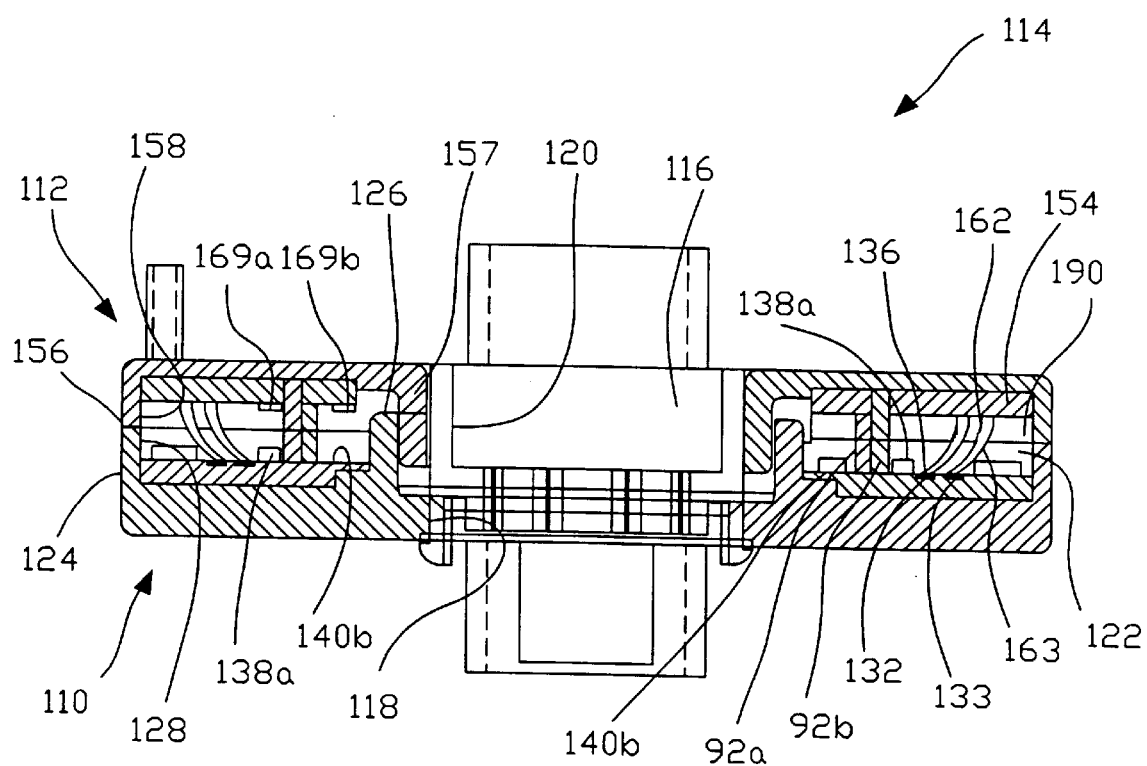
FIG. 10 is a cross-sectional side view of an articulating connector assembly with the housing assembly of FIG. 7 rotatably attached to the hub assembly of FIG. 9.

Together, the circumference of the hub's coupling rings 170a and 170b are generally equal, respectively, to the housing's coupling rings 142a and 142b. In addition, the hub 112 has an intermediate circumferential wall 192b which is integral to the hub, is located between the coupling rings 170a and 170b, and is located just outside of the housing's intermediate circumferential wall 192b when assembled as shown in FIG. 10. The purpose of the intermediate circumferential walls 192a and 192b is to optically isolate first coupling rings on the housing and the hub from the second coupling rings. The means of signal coupling between the hub's second coupling ring 170b and the housing's second coupling ring 142b is the same as that presented by the first embodiment shown in FIGS. 1–5. However, the housing and the hub's first coupling rings, 142a and 142b, only provide for unidirectional signal coupling between the hub 112 and the housing 110 via the transmitters 138a on the housing and the receivers 169a on the hub. Thus, the unidirectional signal coupling between the housing 110 and the hub 112 provides for the immediate transfer of important signals such as a command to fire an electrical squib connector of an airbag.

The embodiments shown in FIGS. 1–10 all have used optical coupling as a means for signal coupling between the housing and the hub. However, optical coupling should not be limited to just the visible spectrum of light. Instead, optical coupling includes the spectrum of light which is not visible to the human eye.

Furthermore, it is preferred that the optical transmitters have a wide dispersion angle during light transmission and the receivers have a wide reception angle lens to receive the radiation from the transmitters. In addition, as shown in FIGS. 11A, 11B, 11C, 11D and 12, light piping may be preferred in transmitting and receiving optical signals so that radiant energy is more effectively received and transmitted.

Figure 11A:
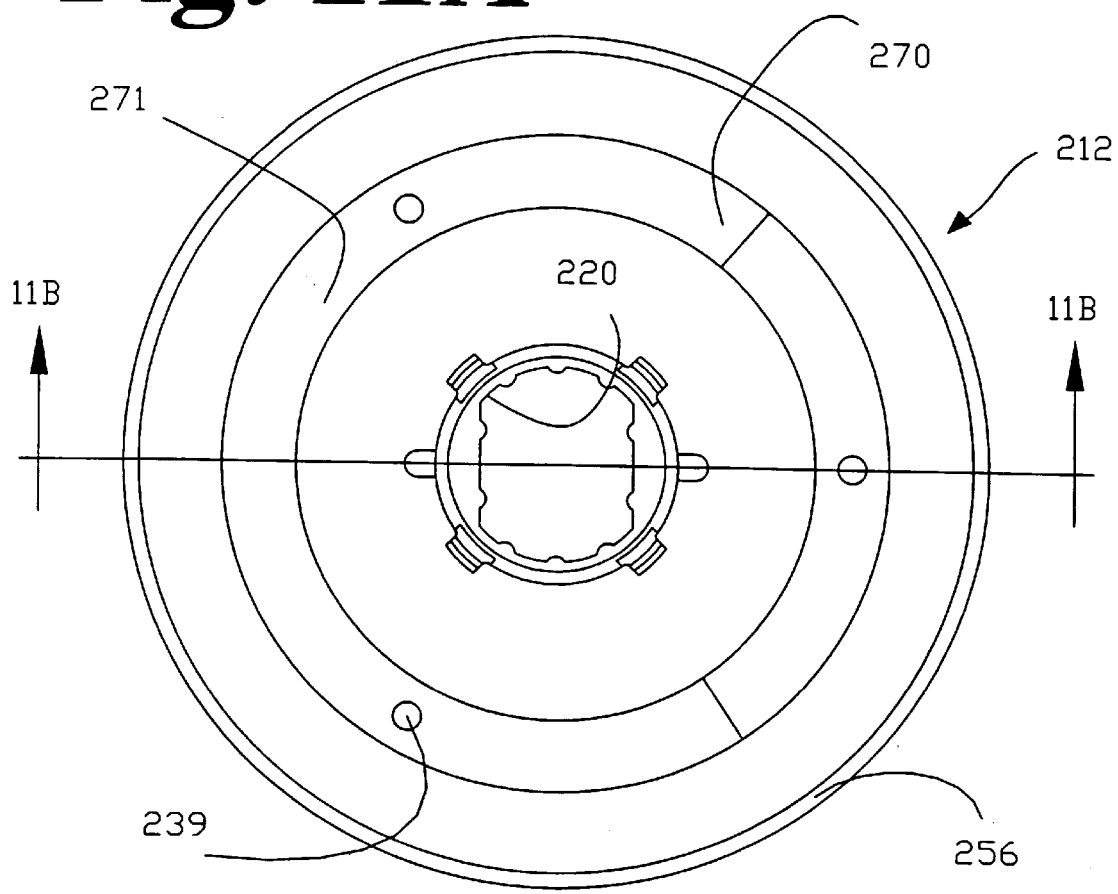
FIG. 11A is a plan view of a hub having a light piping ring for use with an articulating connector in accordance with the present invention.
Figure 11B:
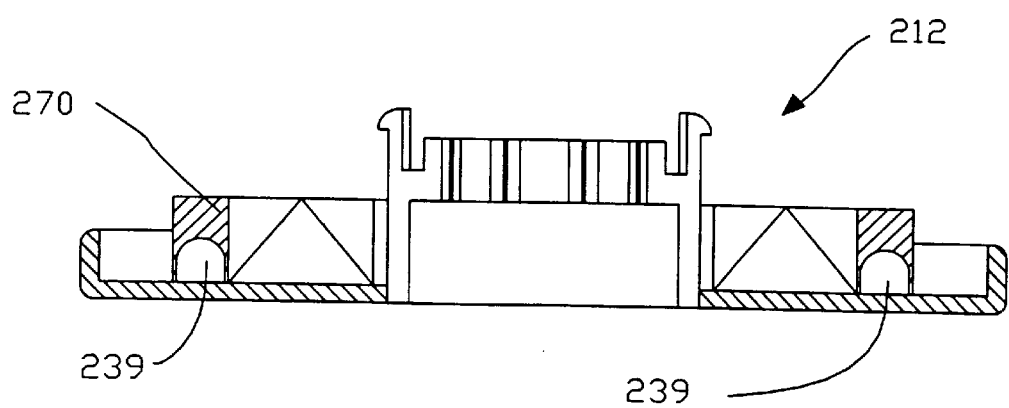
FIG. 11B is a cross-section side view of the hub depicted in FIG. 11A, taken along line 11B—11B.

In FIGS. 11A and 11B, a hub 212 is depicted which has a light piping ring 270 mounted thereon. The light piping ring 270 is preferably made of transparent refractor material, for example, optical grade polycarbonate, and is configured to form a circle around the hub's aperture 220. Within the light piping ring 270 are optical transmitters and/or receivers 239 or, alternatively, optical fiber which transmits and receives energy to remotely located transducers. Correspondingly, the hub 212 receives radiant energy by the light striking the top surface 271 of the light piping ring 270 and being focused by the ring to strike the receivers 239. In addition, the hub 212 transmits radiant energy by the transmitters 239 generating radiant energy which is focused by the ring to evenly emanate from the top surface 271 of the ring. The light piping ring 270 is constructed having refracting and reflecting surfaces to facilitate focusing for transmission of radiant energy and having similar light piping system to facilitate reception of radiant energy.

Figure 11C:
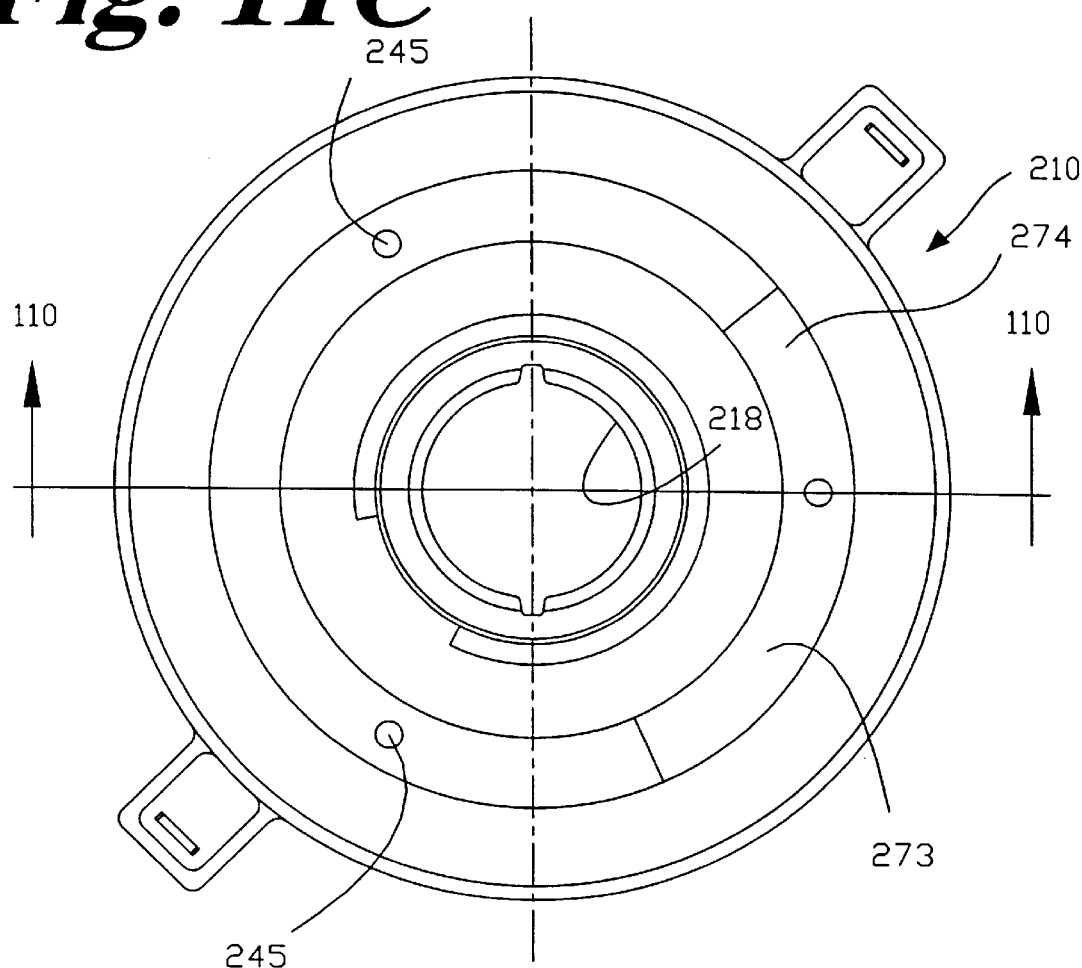
FIG. 11C is a plan view of a housing having a light piping ring for use with an articulating connector in accordance with the present invention.
Figure 11D:
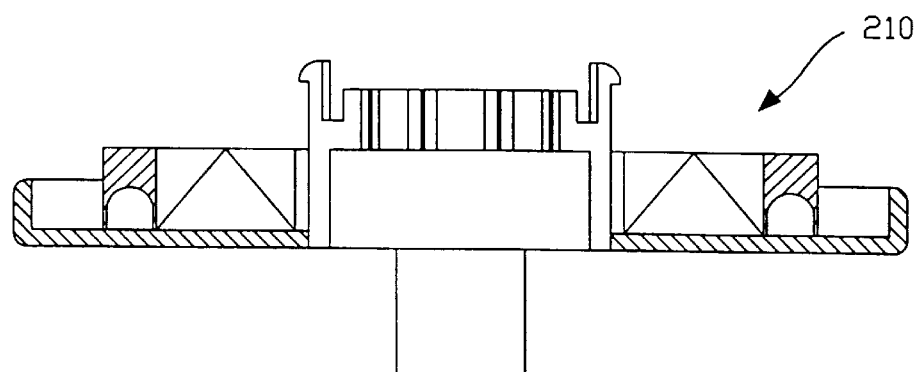
FIG. 11D is a cross-section side view of the housing depicted in FIG. 11C, taken along line 11D—11D.

Corresponding, in FIGS. 11C and 11D, a housing 210 is depicted which also has a light piping ring 274 mounted thereon. The light piping ring 274 is made of the same material as the hub's light piping ring and is configured to form a circle around the housing' aperture 218.

Correspondingly, the housing 210 also receives radiant energy by radiant energy striking the top surface 273 of the light piping ring 274 and being focused by the ring to strike the receivers 245. In addition, the housing 210 transmits radiant energy by the transmitters 245 generating radiant energy which is focused by the ring to evenly emanate from the top surface 273 of the ring.

Figure 12:
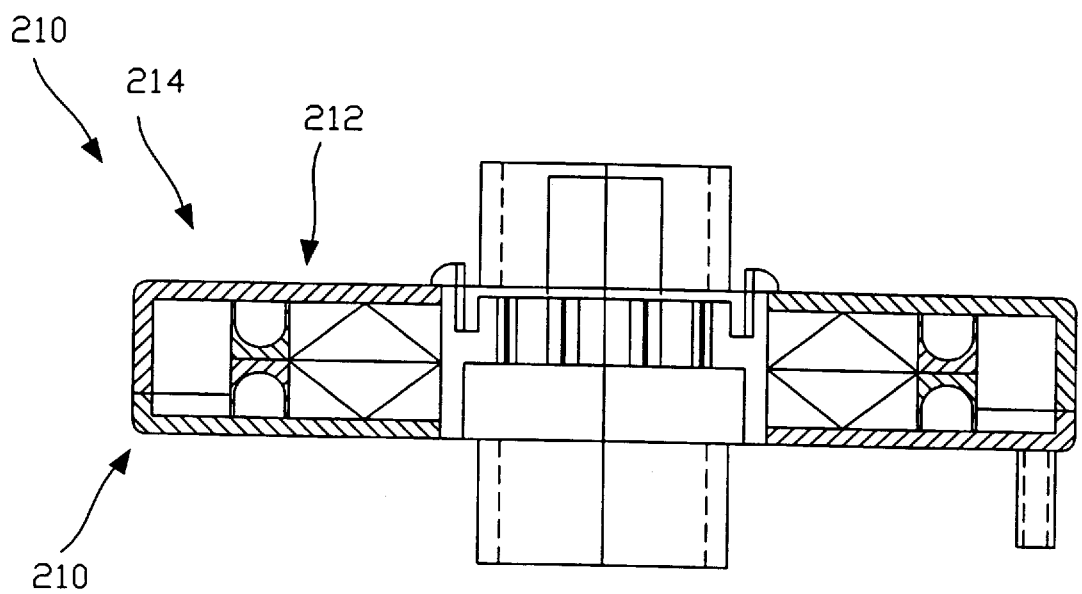
FIG. 12 is a cross-sectional side view of an articulating connector assembly with the housing assembly of FIG. 11D rotatably attached to the hub assembly of FIG. 11B.

Referring to FIG. 12, a cross-sectional side view of an articulating connector assembly 214 is shown with the housing assembly 210 of FIG. 11D rotatably attached to the hub assembly 212 of FIG. 11B. Corresponding the light piping ring in the hub and the light piping ring in the housing directly appose each other.

Figure 13:
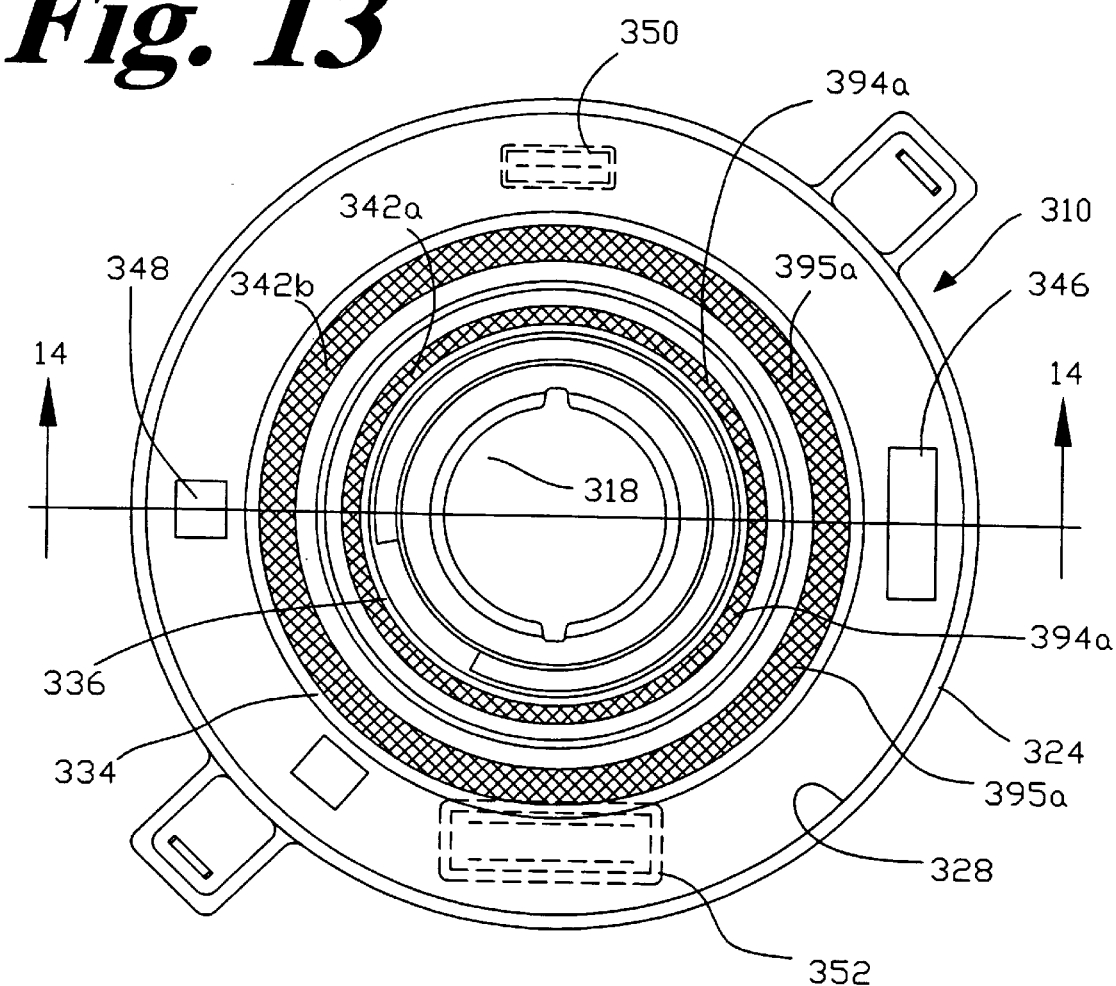
FIG. 13 is a plan view of another embodiment of an articulating connector housing assembly employing coupling in accordance with the present invention.
Figure 14:
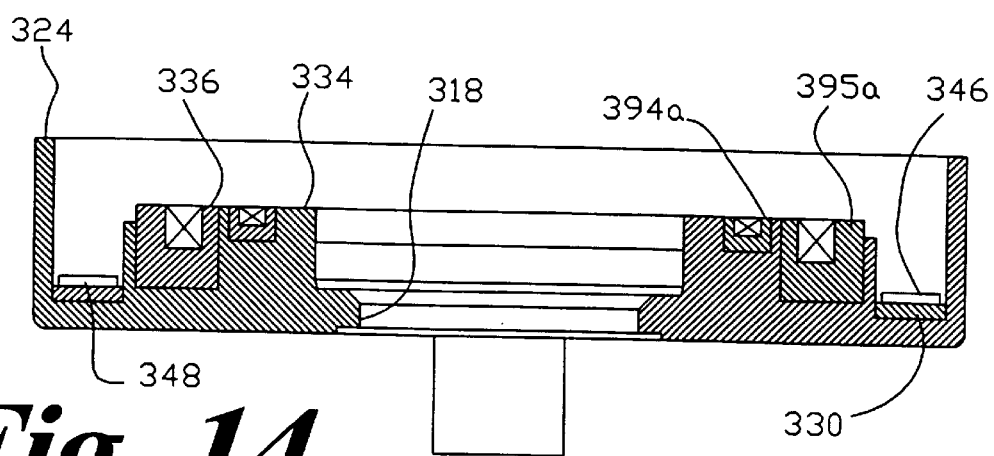
FIG. 14 is a cross-sectional side view of the articulating connector housing assembly depicted in FIG. 13, taken along line 14—14.

In addition to using radiant energy for signal coupling between the hub and the housing, other energy transfer methods can also be employed. For example, radio frequency coupling, pressure wave coupling, inductively coupled coils, capacitive coupling, and other such methods can be used. In FIGS. 13–17, another articulating connector embodiment is depicted which employs coupling in accordance with the present invention. The numbering of the elements within FIGS. 13–17 correspond with those like elements in FIGS. 1–5. The primary difference between the embodiment depicted in FIGS. 13–16 from the embodiments in FIGS. 1–12 is that the articulating connector in FIGS. 13–16 uses inductive coupling as a means for transferring both power and data signals between the hub 312 and the housing 310. In FIGS. 13 and 14, two inductors 394a and 395a are mounted within the housing 310. The inductors 394a,395a define circular coupling rings 342a and 342b which have different circumferences. Each coupling ring 342a,342b forms a continuous circle around the housing's first aperture 318 with coupling ring 342a being closest to the first aperture and surrounded by coupling ring 342b. Furthermore, each coupling ring 342a,342b is flush with the top surface 334 of the housing in order to provide an exposed surface 336.

Figure 15:
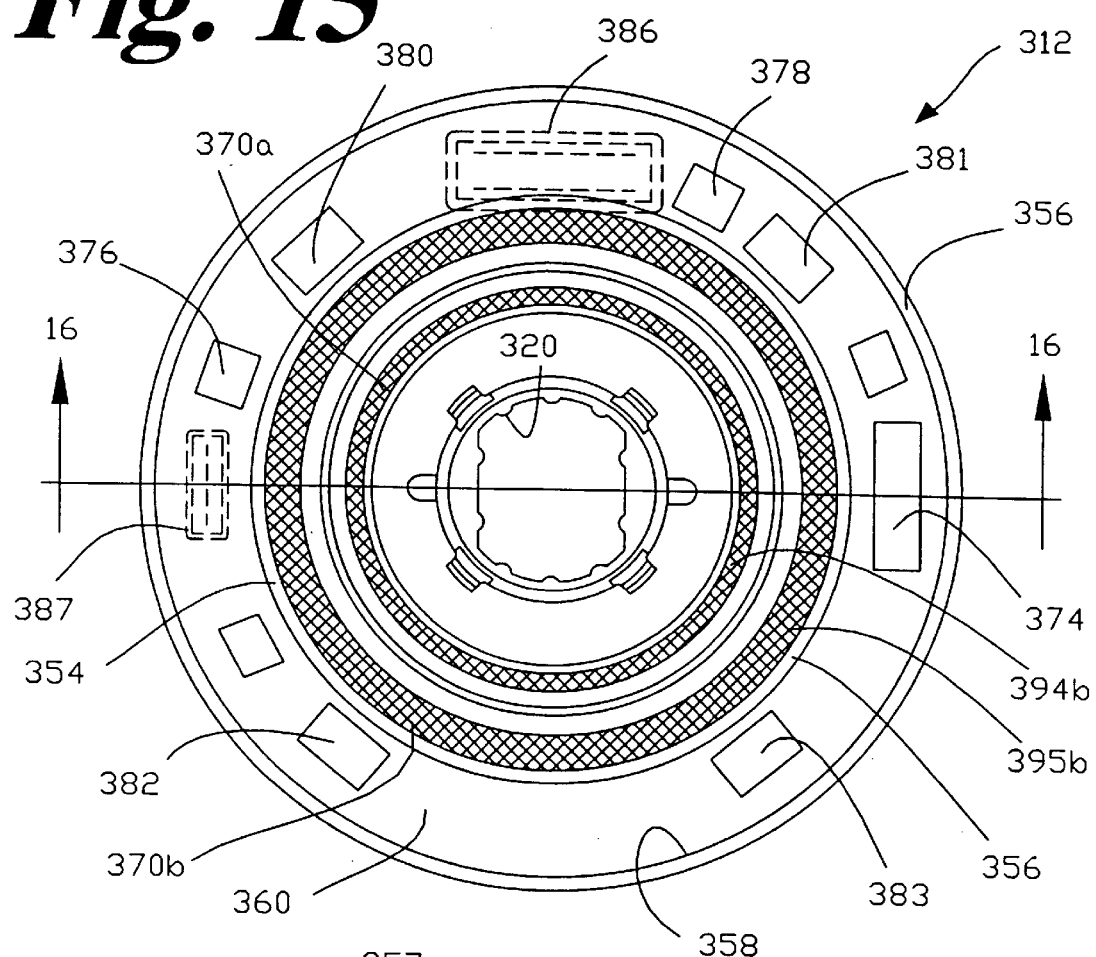
FIG. 15 is a plan view of another embodiment of an articulating connector hub assembly employing coupling in accordance with the present invention.
Figure 16:
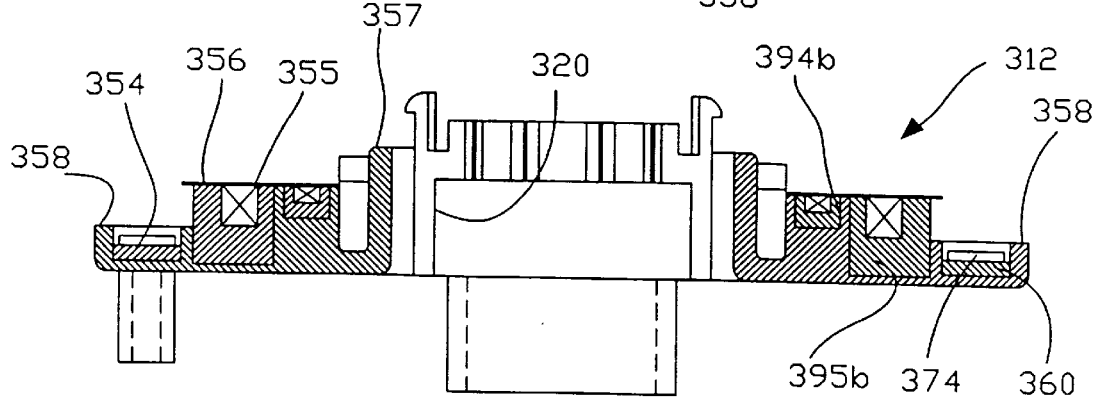
FIG. 16 is a cross-sectional side view of the articulating connector hub assembly depicted in FIG. 15, taken along line 16—16.

Moving to FIGS. 15 and 16, two other inductors 394b, 395b are mounted within the hub 312. The inductors 394b and 395b define coupling rings 370a and 370b with different circumferences and which are equal to the housing coupling rings 342a and 342b, respectively. Each coupling ring 370a,370b forms a continuous circle around the hub's aperture 320 with ring 370a being closest to the aperture 320 and surrounded by ring 370b. Furthermore, rings 370a,370b are flush with the top surface 356 of the hub 312 and has a radial bearing 355 placed over both rings.

Figure 17:
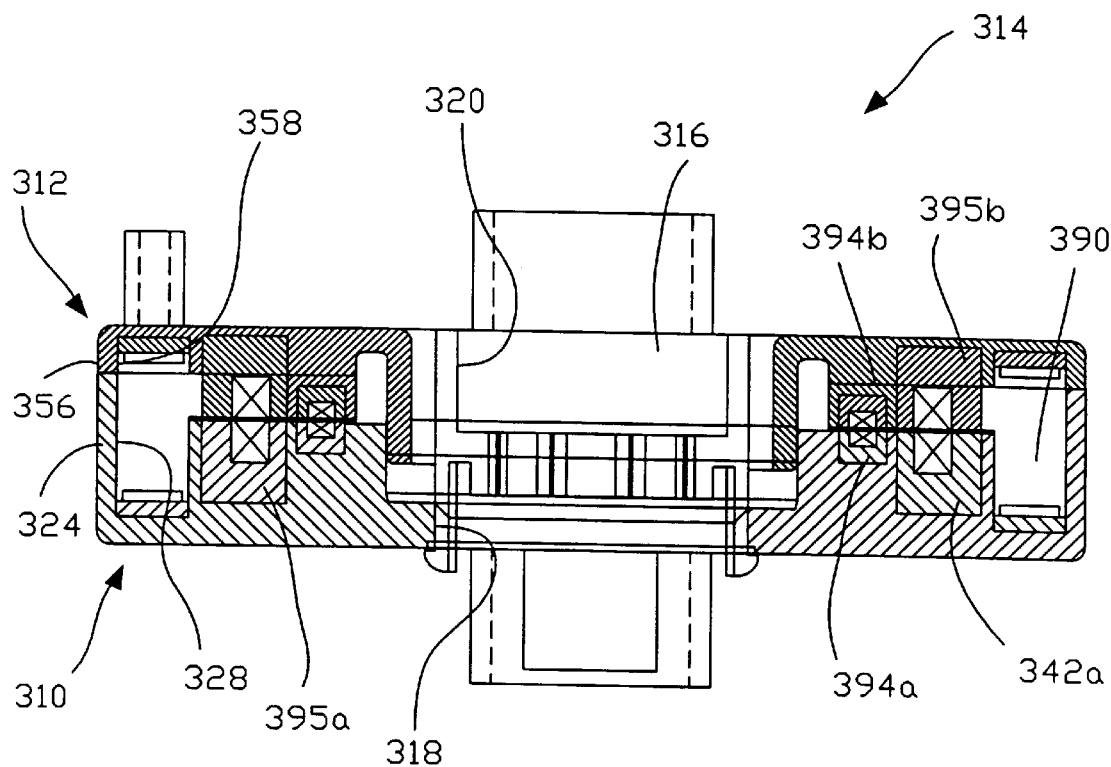
FIG. 17 is a cross-sectional side view of an articulating connector assembly with the housing assembly of FIG. 14 rotatably attached to the hub assembly of FIG. 16.

Correspondingly, referring to FIG. 17, coupling of power from the housing 310 to the hub 312 is accomplished by inductive coupling between ring 370b, consisting of inductor 395b on the hub 312, and ring 342b, consisting of inductor 395a on the housing 310. Likewise, signal coupling from the housing 310 to the hub 312 is accomplished by inductive coupling between ring 342a, consisting of inductor 394a on the housing 310, and ring 370a, consisting of inductor 394b on the hub 312.

As would be obvious to one skilled in the art, bidirectional data transmission is easily performed between the signal coupling means provided by the articulating connector of FIGS. 13–17. Such bi-directional data transmission would be performed similar to that described for the embodiment shown in FIGS. 1–5. Furthermore, more than one channel of data transmission between the housing 310 and the hub 312 can be simultaneously achieved by utilizing different frequencies in performing the transmission between the coupling rings. Furthermore, with suitable electric circuitry, power and multiply channel or frequency bi-directional data transmission cant be accomplished with only one couple inductor pair.

Figure 18:
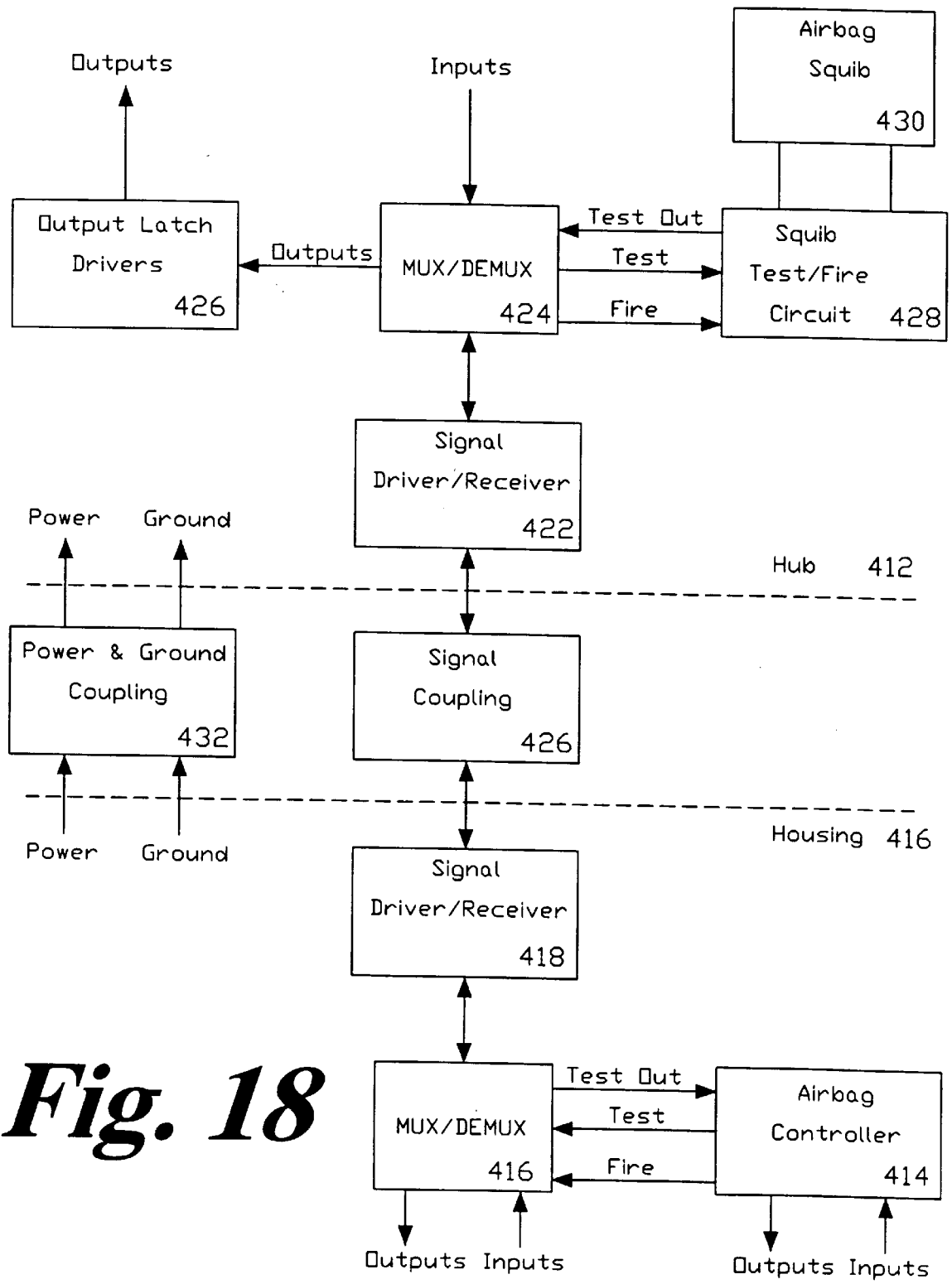
FIG. 18 is a functional block diagram for bi-directional communicating between an articulating connector housing and hub.

As referred to previously in the above embodiments of the invention, the electrical components on the articulating connector's hub and housing control the transmission of both power and signals. Referring to FIG. 18, a functional block diagram for an efficient method of communicating between an articulating connector housing 410 and hub 412 is depicted. Furthermore, functional block diagrams are presented in FIGS. 19 and 20. Correspondingly, it should be understood that a single block may indicate several individual circuits which collectively perform a single function. Furthermore, functional block diagrams are used because it is clear to one of ordinary skill in the art, after perusal of the specification, drawings and claims herein, how to make and use the invention, without undue experimentation.

Referring specifically to FIG. 18, within the housing is an airbag controller 414, an encoder/decoder 416, and a signal driver/receiver 418. The airbag controller 414 is adapted to receive inputs for determining when to deploy an airbag. Also, the airbag controller 414 receives a test output signal, which indicates the condition of the airbag squib. Furthermore, the airbag controller 414 transmits both test and fire commands to the encoder/decoder 416.

The encoder/decoder 416 also receivers various command inputs from other devices within the automobile. Any data which is to be transmitted to the hub 412 is encoded by the encoder/decoder 416 into a word consisting of an address and corresponding data. The encoder/decoder 416 then serially transmits the word to the signal driver/receiver 48.

Likewise, in addition to preparing data for transmission from the housing 410 to the hub 412, the encoder/decoder 416 also receives data words from the hub 412, via the signal driver/receiver 418. Once the encoder/decoder 416 receives a data word, the word is decoded so that the corresponding data is transmitted to the correct automobile output or the airbag controller 414.

As indicated above, the signal driver/receiver 418 provides an interface between the signal coupling 420 and encoder/decoder 416. The signal driver/receiver 418 filters signals received by the signal coupling 420 and transmits them to the encoder/decoder 418. In addition, the signal driver/receiver 418 receives signals from the encoder/decoder 416 and retransmits them in the proper signal format to the signal coupling 420.

Also as indicated above, the signal coupling 420 in FIG. 18 allows for a signal to be transmitted between the hub 412 and the housing 410. The signal coupling 420 can consist of any signal coupling means such as optical coupling, radio frequency coupling, pressure wave coupling, inductively coupled coils, capacitive coupling, and any other such method.

As shown in FIG. 18, the signal coupling 420 both receives and transmits signals from the hub 412 which has a signal driver/receiver 422, an encoder/decoder 424, output latch drivers 426, a squib test/fire circuit 428, and possibly an airbag squib 430.

Like the signal driver/receiver 418 in the housing 410, the signal driver/receiver 422 in the hub 412 provides an interface between the signal coupling 420 and the hub's encoder/decoder 424. The signal driver/receiver 422 filters the signals received by the signal coupling 420 and transmits them to the hub's encoder/decoder 424. In addition, the signal driver/receiver 422 also receives signals from the encoder/decoder 424 and retransmits them in the proper format to the signal coupling 420.

Likewise, the hub's encoder/decoder 424 performs the same function as the housing's encoder/decoder 416 which consists of data which is to be transmitted to the housing 410 into a word consisting of an address and corresponding data. The encoder/decoder 424 then serially transmits the word to the signal driver/receiver 422.

The encoder/decoder 424 also receives data words from the housing 410, via the signal driver/receiver 422. Once the hub's encoder/decoder 424 receives a data word, the word is decoded so that the corresponding data is transmitted to the correct devices on the hub.

One of the optional devices the hub's encoder/decoder 424 provides an output to is the output latch drivers 426. The drivers 426 receive signals from the encoder/decoder 424 are the outputs are held or latched constant as power output signals until new data is received from the encoder/decoder 424.

Furthermore, the hub's squib test/fire circuit 428 receives the test and fire commands from the encoder/decoder 424 and the squib test/fire circuit 428 transmits an output signal to the encoder/decoder 424 which indicates the condition of the airbag squib.

Besides signal coupling, the embodiment in FIG. 18 also provides for power and ground coupling 432. The coupling means is provided by means such as the sliding contacts depicted in FIGS. 1–5, optical coupling, radio frequency coupling, pressure wave coupling, inductively coupling, capacitive coupling, and other such methods. It should be noted that the power received by the hub may require filtering by, for example, capacitors or electrochemical storage. In addition, the power received by the hub may need to be stored in order to fire the airbag squib. Therefore, capacitors or an electrochemical battery may again be required to be mounted to the hub.

Finally, it is preferred that the data transmission between the housing and the hub conform to SAE J1850 which is a standard of the Society of Automotive Engineers.

Figure 18A:
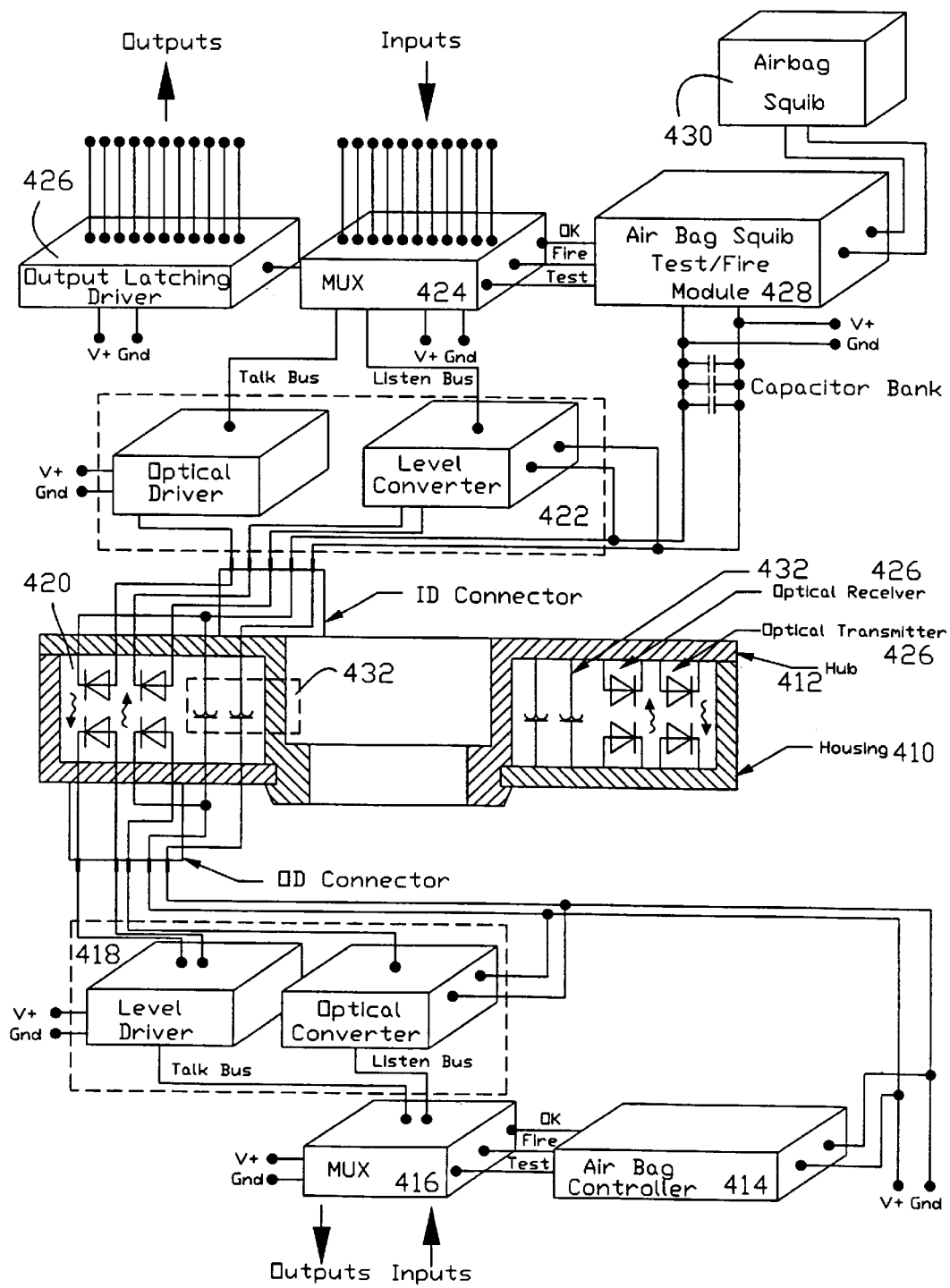
FIG. 18A is corresponds to the functional block diagram in FIG. 18, wherein optical coupling is used for data transfer and sliding contacts are used for power coupling.

Referring to FIG. 18A, another functional block diagram is provided which corresponds to FIG. 18 with optical coupling used for data transfer and sliding contacts are used for power and ground coupling. Corresponding, like elements between FIG. 18 and FIG. 18A are numbered the same. For example, the signal driver/receiver 418 in FIG. 18 is numbered as both the level converter and optical driver in FIG. 18A.

Figure 19:
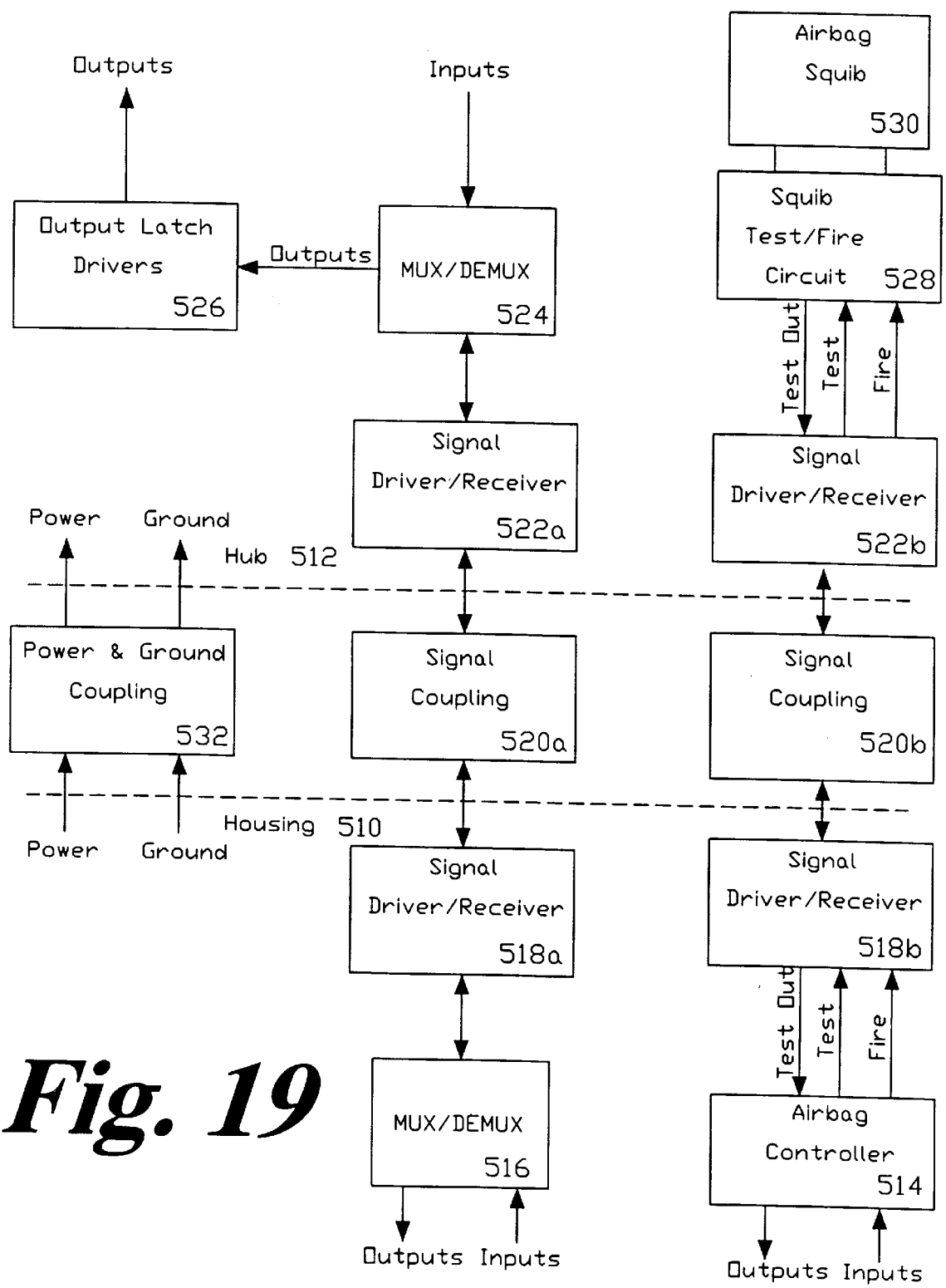
FIG. 19 is a function block diagram of another embodiment for dual bi-directional communicating between an articulating connector housing and hub.

Moving to FIG. 19, another functional block diagram of another embodiment for communicating between an articulating connector's housing and hub is depicted. The numbering of the elements within FIG. 19 correspond with those like elements in FIG. 18. The primary difference between the embodiment depicted in FIG. 19 from the embodiment in FIG. 18 is that the airbag controller 514 is provided with a direct communication link with the squib test/first circuit 528, via a separate channel. Thus, the immediate transfer of important signals is provided for such as a command to fire the airbag squib.

Figure 20:
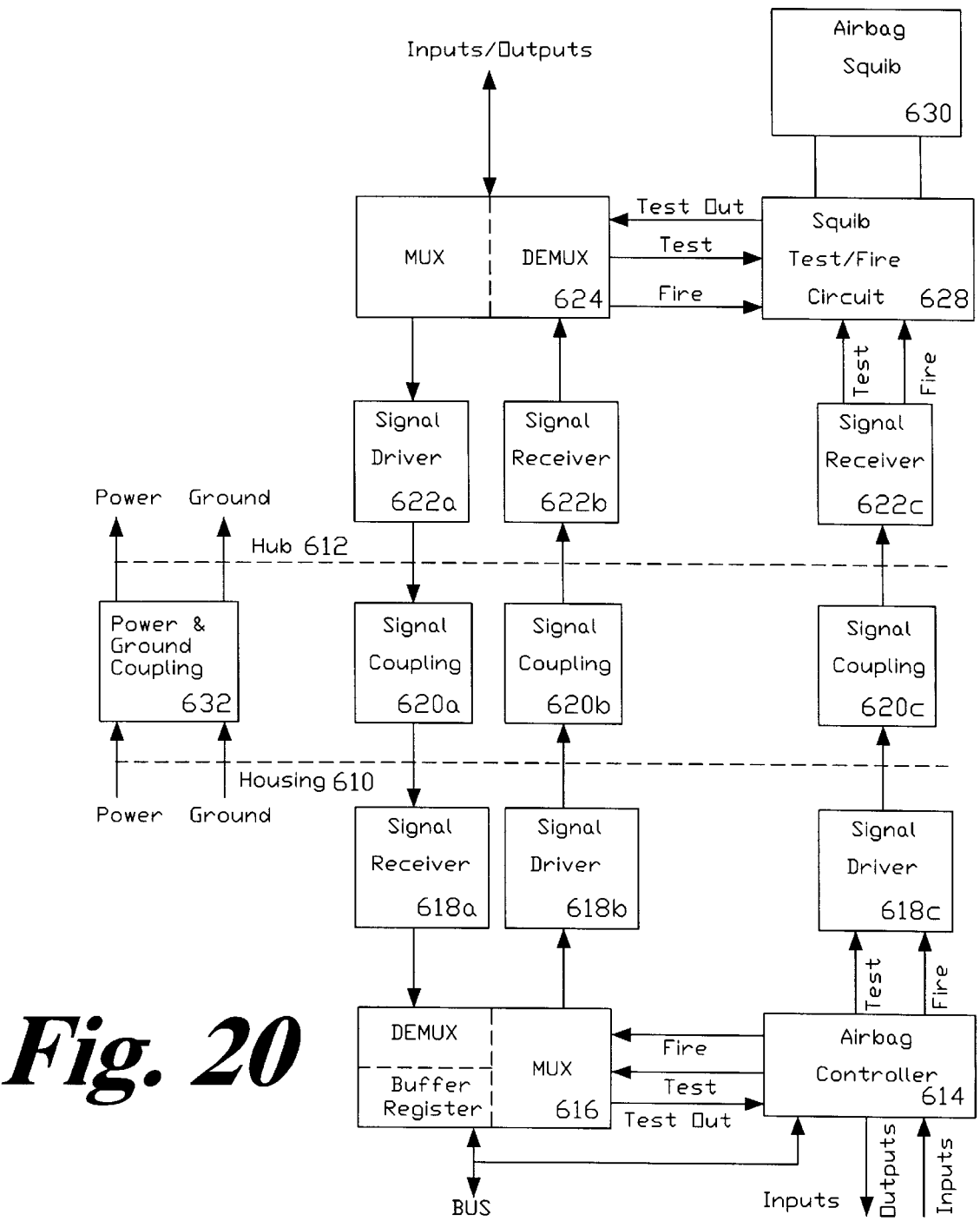
FIG. 20 is a function block diagram of a further embodiment for full duplex communication with airbag control redundancy between an articulating connector housing and hub.

Referring to FIG. 20, another functional block diagram of a further embodiment for communicating between an articulating connector's housing and hub is depicted. The numbering of the elements within FIG. 20 corresponds with those like elements in FIGS. 18 and 19.

The primary difference between the embodiment depicted in FIG. 20 from the embodiments in FIGS. 18 and 19 is that the airbag controller 614 is provided with both a unidirectional direct communications channel and a bi-directional communications channel with the squib test/fire circuit 628.

In addition, asynchronous bi-directional communication is provided between the encoder/decoder on the housing 610 and the encoder/decoder 624 on the hub 612.

However, since asynchronous bidirectional data communications is provided for, the encoder/decoder 616 on the housing 610 is also provided with a buffer register.

It should be understood that various changes and modifications to the presently preferred embodiments described herein will be apparent to those skilled in the art. Such changes and modifications may be made without departing from the spirit and scope of the present invention and without diminishing its attendant advantages. For example, the coupling and method described above can be used in an apparatus, not just an articulating connector, which has a housing and a hub held in rotatable relation to the housing. It is therefore intended that such changes and modifications be covered by the appended claims.

I claim:

1. An articulating signal connector comprising:
   a) a housing;
   b) a hub being carried in rotatable relation to said housing, with power being coupled between said housing and said hub;
   c) said housing and said hub defining at least one annular propagation chamber enclosed therebetween;
   d) a plurality of discrete, active device signal transmitters disposed on at least one of said housing and said hub circumferentially spaced within said annular propagation chamber;
   e) a signal driver associated with said at least one of said housing and said hub on which said transmitters are disposed, said signal driver generating an electrical signal capable of driving said plurality of transmitters; and
   f) a plurality of discrete signal receivers disposed on at least the other of said housing and said hub circumferentially spaced within said annular propagation chamber;
   g) said transmitters and receivers providing a means for coupling signals between said hub and said housing.

2. The signal connector of claim 1, wherein said transmitters and receivers comprise optical transmitters and receivers.

3. The signal connector of claim 2, further including a light pipe mounted on said hub such that optical signals are focused toward optical receivers, and dispersed evenly away from transmitters mounted on said hub.

4. The signal connector of claim 2, further including a light pipe mounted on said housing such that optical signals are focused toward optical receivers, and dispersed evenly away from transmitters mounted on said housing.

5. The signal connector of claim 1, wherein said transmitters and receivers comprise mutually coupled inductors mounted on both said housing and said hub.

6. The signal connector of claim 1, wherein said transmitters and receivers comprise radio frequency transmitters and receivers.

7. The signal connector of claim 1, wherein said transmitters and receivers comprise pressure wave generators and receivers.

8. The signal connector of claim 1, wherein said signal connector further includes power coupling between said hub and said housing.

9. The signal connector of claim 8, wherein said power coupling is provided by slidable contacts mounted to said hub and said housing.

10. The signal connector of claim 8, wherein said transmitters and receivers comprise mutually coupled inductors.

11. The signal connector of claim 8, wherein said transmitters and receivers comprise optical transmitters and receivers.

12. An apparatus for transmitting signals from a stationary member as part of a steering column in an automobile to a rotatable member attached to a steering wheel, said apparatus comprising:
   a) a stationary housing mounted to said stationary member, said housing having a disk-like surface with a first radial depression;
   b) a hub attached to said rotatable member, and being carried in rotatable relation to said housing, whereby the rotating motion of said hub corresponds the rotation of said steering wheel, said hub also having a disk-like surface with a second radial depression opposing said first radial depression, said first and second radial depressions forming an enclosed annular signal propagation chamber;
   c) a plurality of discrete signal transmitters disposed on at least one of said housing and said hub, circumferentially spaced within said propagation chamber;
   d) a plurality of signal receivers disposed on at least the other of said housing and said hub, circumferentially spaced within said propagation chamber;
   e) said transmitters, receivers, and propagation chamber forming a non-contact means for coupling signals between said hub and said housing.

13. An articulating signal connector comprising:
   a) a housing;
   b) a hub being carried in rotatable relation to said housing, with power being coupled between said housing and said hub;
   c) said housing and said hub defining at least one annular propagation chamber enclosed therebetween;
   d) a plurality of discrete signal transmitters disposed on at least one of said housing and said hub circumferentially spaced within said annular propagation chamber;
   e) a plurality of discrete signal receivers disposed on at least the other of said housing and said hub circumferentially spaced within said annular propagation chamber;
   f) said transmitters and receivers providing a means for coupling signals between said hub and said housing.

14. The signal connector of claim 13 wherein said power coupling is provided by slidable contacts mounted to said hub and said housing.

15. The signal connector of claim 13 wherein said transmitters and receivers comprise optical transmitters and receivers.

16. The apparatus of claim 15 having a light pipe disposed within said propagation chamber wherein said light pipe evenly disperses light radiated from said optical transmitters, and focuses light signals onto said optical receivers.

* * * * *